March 22, 1932.  J. T. CRUTE  1,850,662
VALVE FOR PNEUMATIC TIRES
Filed March 23, 1931
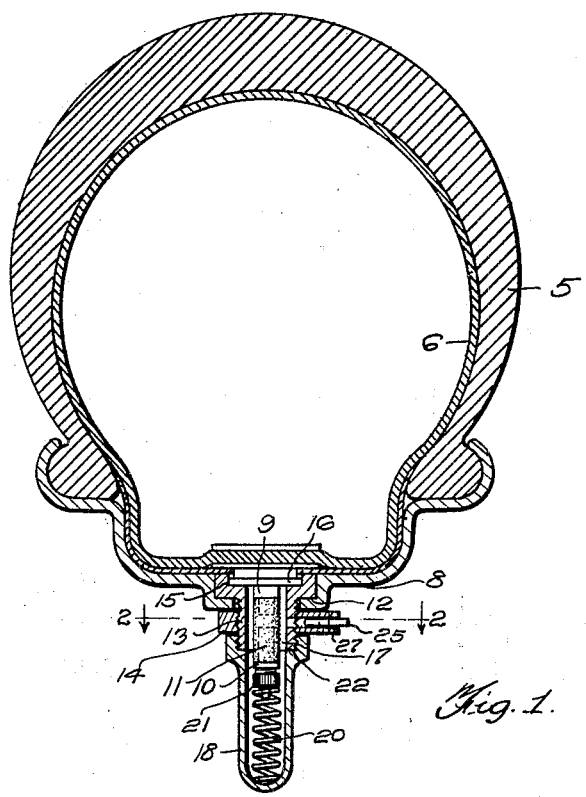
Fig. 1.
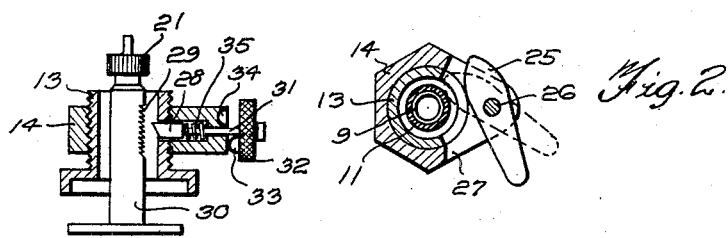
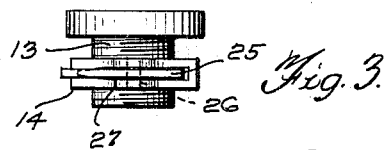
Fig. 4.  Fig. 3.
INVENTOR.
Joseph T. Crute,
BY
ATTORNEY.

Patented Mar. 22, 1932

1,850,662

UNITED STATES PATENT OFFICE

JOSEPH THOMAS CRUTE, OF VIRGILINA, VIRGINIA

VALVE FOR PNEUMATIC TIRES

Application filed March 23, 1931. Serial No. 524,744.

This invention relates to valves for pneumatic tires, and it has for its object to provide an improved type of construction which will avoid the serious losses that are being caused by the construction at present employed.

Under existing practice the inflation valve tubes of pneumatic automobile tires are locked to the rims of wheels by lock nuts; the valve stems being relatively long and externally threaded for engagement with said lock nuts. Consequently, if the tire is run in a deflated condition, there is a tendency for the tire to creep with relation to the rim and since the inflation valve stem can not follow the tube in its tendency to travel with respect to the rim of the wheel under the creeping action, the inflation tubes are frequently torn bodily from the tubes.

This result is avoided under the present invention by providing a structure wherein the inflation tube is left wholly free of the rim and means are provided for initially ejecting the tube from the rim upon deflation of the valve tube, the proportioning of the parts being such as to permit the ready withdrawal of the inflation tube from the rim upon deflation of the inner tube.

In the accompanying drawings

Figure 1 is a transverse sectional view through a tire and inflation tube constructed in accordance with the invention.

Fig. 2 is a horizontal sectional view on the line 2—2 of Fig. 1.

Fig. 3 is a detailed side elevation of the retention device hereinafter described and Fig. 4 is a detailed sectional view of a modified form of retention device.

Like numerals designate corresponding parts in all the figures of the drawings.

Referring to the drawings, 5 designates an outer tire casing, 6 is a conventional inner tube and 7 a conventional type of rim which comprises a depressed portion 8. The inflation tube consists of an inner nipple 9, an outer nipple 10 adapted to receive the usual air check valve, not shown, and an interposed connecting element in the form of a rubber tube 11, the function of the latter being to permit the inflation tube, as a whole, to bend, if necessary, as it passes from the rim.

A recessed portion 12 of the rim receives an externally threaded nipple 13 and this nipple is clamped in place within the rim by a lock nut 14. The inner face of the nipple is preferably recessed, at 15, for the reception of a rubber or like washer 16. The inflation tube passes through the bore 17 of the nipple and the bore of this nipple is considerably larger in diameter than the inflation tube. A dust cap 18 is adapted to screw upon the nipple 13 and this dust cap carries an ejecting spring 20. The outer end of the spring is preferably fixed to the dust cap so that it can not be easily dislodged therefrom and the inner end of the spring bears upon the valve cap 21.

The dust cap is preferably shouldered, at 22, so that no shoulder is presented by the outer end of the nipple upon which the cap 21 might hang when being ejected by the spring 20. The operation of the device is as follows:

When the inner tube 6 becomes deflated to such an extent that there is any tendency for the tube to creep with relation to the rim and along with the outer casing, the inflation tube moves freely out of the dust cap 18 and the nipple 13. This is due to several features of construction as follows:

1. The inflation tube, as a whole, is materially shorter than the tube commonly employed.

2. The bore of the nipple is materially larger in diameter than the diameter of the inflation tube.

3. The inflation tube is not locked or secured to the rim by lock nuts or otherwise.

4. The ejecting spring 20 aids in forcing the inflation tube inwardly.

Since the inflation tube is not locked to the rim it becomes necessary to provide means for holding the inflation tube against inward movement until the inner tube is inflated and while applying an air pump thereto. Many ways may be resorted to for accomplishing this result.

One such means is illustrated in Figs. 1, 2 and 3 where the nut 14 and nipple 13 are shown as being slotted for the movement of a friction dog 25 that is pivoted to the nut at 26. When this dog is thrown to the dotted line position indicated in Fig. 2, its inner end bears upon the inflation tube and holds said tube against inward movement until the air pump can be applied thereto. Of course, if the inner tube is inflated, the inflation tube will maintain its outwardly projected position. After the tube has been inflated, the dog 25 may be swung around to free it of the tube and the width of the slot 27 in the nut, in which the dog moves, is such that the dog will be frictionally bound and held in its disengaged position.

I have illustrated a modified form of retention means for the tube in Fig. 4. In this figure, the lock nut 14 carries a detent latch 28 which is adapted to engage ratchet teeth 29 on the inflation tube 30. The detent 28 comprises a shank 31 upon which a head 32 is mounted to turn. This head carries a boss or projection 33 upon its inner face and when this projection is aligned with a recess 34 formed in the outer face of the nut, a spring 35 can act to force the detent 28 into engagement with the teeth 29. After the air pump has been engaged with the tube 30 and the tire has been inflated, a turning movement is imparted to the head 32 to cause the boss 33 to ride out of the recess 34 whereupon the detent will be held in a retracted position against the tension of spring 35 and out of engagement with the teeth 29.

Many ways will readily suggest themselves to those skilled in the art of rearranging the parts without departure from the basic principals involved, consequently, it is to be understood that the invention is not limited to the precise construction set forth, but that it includes within its purview whatever changes fairly come within either the terms or the spirit of the appended claims.

Having described my invention, what I claim is:

1. The combination, in a structure of the character described comprising an inner tube, an inflation tube carried thereby, a rim carried part having an internal bore of a diameter considerably in excess of the diameter of the inflation tube and through which said inflation tube passes, and a dust cap, of means within the dust cap for bearing upon and ejecting said inflation tube through the rim carried part.

2. A structure as recited in claim 1 in combination with an externally manipulatable means for holding said tube against inward movement during inflation of the tire.

3. A structure as recited in claim 1 in combination with means for holding the inflation tube against endwise movement comprising ratchet teeth formed upon the tube, a spring actuated detent engageable with said teeth, and means for holding said detent in retracted position after the tire has ben inflated.

4. The combination, in a structure of the character described comprising an inner tube, a bendable inflation tube carried thereby and a rim carried part having an opening therethrough of considerably larger diameter than the inflation tube through which said tube freely passes, and a dust cap enclosing said inflation tube, of a spring within the dust cap tending to eject the inflation tube therefrom.

5. A structure as recited in claim 1 in combination with a laterally acting member adapted to engage the inflation tube and hold it against inward movement during inflation.

6. The combination in a structure of the character described comprising an inner tube, an externally smooth inflation tube carried thereby, a rim having an opening therethrough, a tubular nipple passing through said opening, a lock nut threaded upon the nipple and binding the same to the rim, and a dust cap threaded upon the nipple; said inflation tube passing through the bore of said nipple, the bore of the nipple being materially larger in diameter than the diameter of the inflation tube, of means within the dust cap tending to eject the inflation tube therefrom, and means carried by the lock nut for holding the inflation tube against endwise movement, said means comprising a pivoted lever adapted to move inwardly through the lock nut and the nipple and into engagement with said inflation tube as and for the purposes set forth.

In testimony whereof I affix my signature.

JOSEPH THOMAS CRUTE.